United States Patent
Dv

(10) Patent No.: US 9,852,302 B2
(45) Date of Patent: Dec. 26, 2017

(54) SYSTEM AND METHOD FOR CHATTING WITH MACHINES

(71) Applicant: VMware, Inc., Palo Alto, CA (US)

(72) Inventor: Raja Rao Dv, San Mateo, CA (US)

(73) Assignee: VMware, Inc., Palo Alto, CA (US)

( * ) Notice: Subject to any disclaimer, the term of this patent is extended or adjusted under 35 U.S.C. 154(b) by 446 days.

(21) Appl. No.: 13/717,369

(22) Filed: Dec. 17, 2012

(65) Prior Publication Data

US 2014/0173751 A1   Jun. 19, 2014

(51) Int. Cl.
*G06F 21/62* (2013.01)
*G06F 21/45* (2013.01)
*G06F 21/60* (2013.01)

(52) U.S. Cl.
CPC ............ *G06F 21/62* (2013.01); *G06F 21/45* (2013.01); *G06F 21/604* (2013.01)

(58) Field of Classification Search
CPC ............. H04L 12/1813; H04L 12/581; G06F 11/3409; G06F 21/62; G06F 21/45; G06F 21/604
See application file for complete search history.

(56) References Cited

U.S. PATENT DOCUMENTS

| | | | |
|---|---|---|---|
| 6,170,067 B1 * | 1/2001 | Liu | G06F 1/26 714/31 |
| 7,155,435 B1 * | 12/2006 | Day | G06Q 10/00 705/1.1 |
| 2004/0019643 A1 * | 1/2004 | Zirnstein, Jr. | G06F 9/546 709/206 |
| 2008/0184170 A1 * | 7/2008 | Periyalwar | G06Q 10/107 715/841 |
| 2008/0194215 A1 * | 8/2008 | Bolanos | H04W 52/223 455/115.1 |
| 2008/0276315 A1 * | 11/2008 | Shuster | H04L 63/1408 726/22 |
| 2009/0077176 A1 * | 3/2009 | Shae | H04L 12/1818 709/204 |
| 2009/0125580 A1 * | 5/2009 | Canning | H04L 69/40 709/203 |
| 2010/0088187 A1 * | 4/2010 | Courtney | G06Q 30/02 705/14.73 |
| 2010/0159883 A1 * | 6/2010 | Pascal | H04L 12/581 455/412.1 |
| 2010/0274689 A1 * | 10/2010 | Hammad | G06Q 20/202 705/30 |
| 2011/0219035 A1 * | 9/2011 | Korsunsky | G06F 17/30 707/784 |
| 2011/0307543 A1 * | 12/2011 | Megginson | G06F 17/30194 709/203 |
| 2012/0036397 A1 * | 2/2012 | Balani | G06F 11/079 714/38.11 |

(Continued)

*Primary Examiner* — Matthew Smithers
*Assistant Examiner* — Gregory M Elmore

(57) ABSTRACT

A human-machine chatting system facilitates real-time two-way communications between a user and a machine. During operation, the system monitors performance of a machine, runs a chat application on behalf of the monitored machine, and determines whether a user is authorized to access performance information associated with the monitored machine. In response to the user being authorized to access the performance information, the system allows the user to obtain the performance information via the chat application.

18 Claims, 6 Drawing Sheets

(56) References Cited

U.S. PATENT DOCUMENTS

| | | | | |
|---|---|---|---|---|
| 2012/0158946 A1* | 6/2012 | Shafiee | ............... | G06Q 30/06 709/224 |
| 2012/0330702 A1* | 12/2012 | Kowalski | ............... | G06Q 10/00 705/7.11 |
| 2013/0036328 A1* | 2/2013 | Mutisya | ............... | G06F 11/3688 714/15 |

* cited by examiner

SYSTEM AND METHOD FOR CHATTING WITH MACHINES

BACKGROUND

Administrators of large numbers of machines (including both physical and virtual machines) often desire to communicate with a monitoring system that monitors the performance of these machines in order to obtain the real-time system state updates. Although most conventional performance-monitoring systems are capable of sending alerts in the form of emails or SMS (short message service) messages to an administrator, such communications are only in one direction and are not in real time. Furthermore, the existing performance-monitoring systems cannot easily facilitate multi-party communication sessions, which are often useful for collective efforts in system-error diagnosis and emergency responses.

SUMMARY

The disclosure herein describes a human-machine chatting system that facilitates real-time two-way communications between a user and a machine. During operation, the system monitors state of a machine, runs a chat application on behalf of the monitored machine, and determines whether a user is authorized to access performance information associated with the monitored machine. In response to the user being authorized to access the state information, the system allows the user to obtain the performance information via the chat application.

In addition, when the user is authorized to access the machine's performance information, the user is added to a contact list associated with the machine, which allows the user to "chat" directly with the machine. Furthermore, the user is allowed to issue executable commands to the machine via the chat application.

BRIEF DESCRIPTION OF FIGURES

In the figures, like reference numerals refer to the same figure elements.

DETAILED DESCRIPTION

Figure 1:
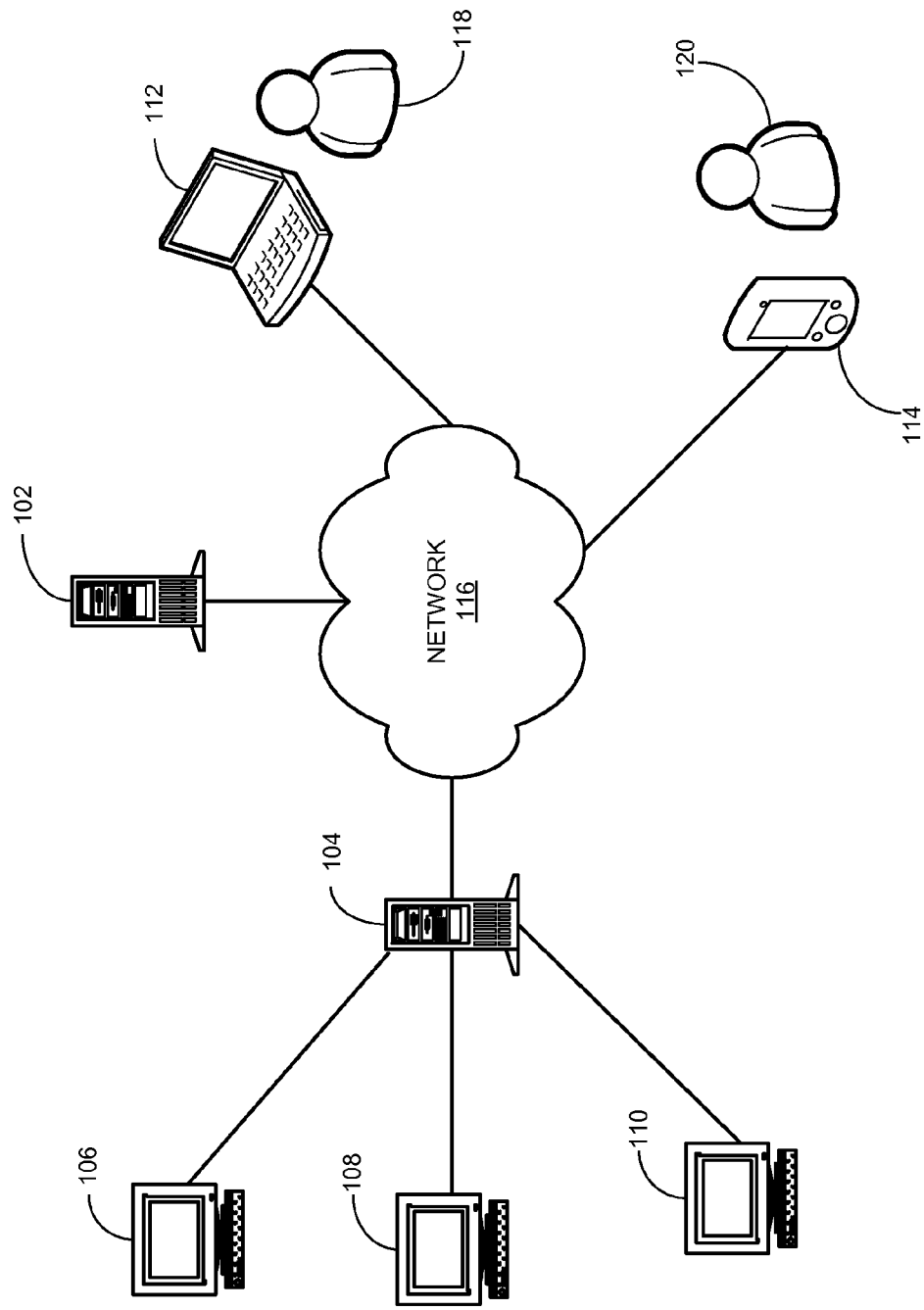
FIG. 1 presents a diagram illustrating an exemplary human-machine chatting system.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The present disclosure describes a system that enables real-time, two-way or multi-party communication using an online chat application that involves at least one user and a machine. The machine, which can include a performance-monitoring tool, appears as a "contact" in the contact list of the user. During operation, the administrator can "chat" back-and-forth with the machine. The "conversation" can include the administrator acquiring a status report, the machine sending a system warning, or the administrator sending a command that causes the machine to perform an action.

In this disclosure, the term "machine" can refer to a physical machine (either a standalone one or a cluster of machines) or a virtual machine. The term "user" can refer to any human user, such as a system administrator or a regular user.

In general, online chatting allows real-time communications, usually in form of text or multi-media-based messages, between two or more parties. Many tools, such as instant messengers, Internet Relay Chat (IRC), talkers, etc., are available for users to perform one-to-one chat or one-to-many group chat. Unlike other one-way communication channels, such as emails or SMS messages, where the delay for visual access to the sent message often hampers the flow of the communications, users of various online chat systems can view the status (such as busy or away) of other users, and receive instant responses from the other users. This direct, bi- or multi-direction, and real-time nature of online chat applications makes them good candidates for enabling users to have real-time, two-way communications with machines. For example, a user can initiate a chatting session with a machine in order to obtain real-time performance status of the machine at any given time. Similarly, the machine can initiate a chat session with the user in order to send system alerts to the user and receive instant responses from the user. However, currently available online chat systems, such as instant messaging applications, do not support such chatting between a human being and a machine. More specifically, most instant messaging solutions are built upon Extensible Messaging and Presence Protocol (XMPP), which has explicit rules regarding which party can be allowed to join a chat conversation. For example, in order for a person A to chat with a person B, each of them needs to obtain permission from the other party in order to add the other party to his contact list. A contact list (also known as a friend list) is a list of other users that can chat with the user.

To solve this problem, the system described herein enables human-machine chatting. FIG. 1 presents a diagram illustrating an exemplary human-machine chatting system. In FIG. 1, a human-machine chatting system 100 includes a chat server 102, a machine-monitoring server 104, a number of machines 106, 108, and 110, a number of chat client machines 112 and 114, and a network 116.

Network 116 may correspond to any type of wired or wireless networks capable of coupling computing nodes (e.g., chat server 102, machine-monitoring server 104, and chat client machines 112 and 114). Such networks include, but are not limited to, a local area network (LAN), a wide area network (WAN), an enterprise's intranet, a virtual private network (VPN), and/or a combination of networks. In one embodiment of the present system, network 116 includes the Internet. Network 116 may also include telephone and cellular networks, such as Global Systems for Mobile Communications (GSM) networks or Long Term Evolution (LTE) networks.

Chat server 102 provides online chat services to multiple client machines. In addition to conventional instant messaging services, such as those based on the SMPP standard, the instant messaging services provided by chat server 102 can also use the Advanced Message Queuing Protocol (AMQP) standard. In one embodiment, chat server 102 runs a chat server application based on RabbitMQ™ (trademark of VMware, Inc., of Palo Alto, Calif.) to facilitate instant messaging among various client machines. Note that the AMQP standard can allow machine-to-machine or machine-to-human communications.

Machine-monitoring server 104, which can also be referred to as a machine-monitoring robot, is responsible for monitoring the performances of machines 106, 108, and 110. Note that machines 106, 108, and 110 can be virtual machines, in which case machine-monitoring server 104 can be a process running on the physical host hosting the virtual machines. Furthermore, machine-monitoring server 104 can be a stand-alone machine, or can be a process that is co-residing with an individual machine being monitored (such as machine 106).

Machine-monitoring server 104 can include a software module that monitors the system state of each machine. Machine-monitoring server 104 also runs a number of chat client applications, with each chat client dedicated to a machine. The chat client applications allow the machines to chat with other machines or human users via network 116. Moreover, machine-monitoring server 104 manages user authentication and access control to the monitored machines, and runs a chat client interface for each individual machine. For example, machine-monitoring server 104 can grant a particular user, such as a user 118 of client machine 112, certain access privileges to machine 106. The access privileges include, but are not limited to: checking the system log, receiving system alerts, and sending executable commands. Once user 118 is granted the access privileges to machine 106, user 118 can add machine 106 as a contact in his contact list. Similarly, machine-monitoring server 104 can also add user 118 as a contact for machine 106.

Users 118 and 120 can communicate with individual machines monitored by machine-monitoring server 104 via chat client applications that run on the client machines, such as client machines 112 and 114. The chat client machines can be a node on network 116 with computational capability and mechanisms for communicating across the network. The chat client machines can include, but are not limited to: a workstation, a personal computer (PC), a laptop computer, a tablet computer, a smartphone, and/or other electronic computing devices with network connectivity. Furthermore, the chat client machines may couple to network 116 using wired and/or wireless connections.

Figure 2:
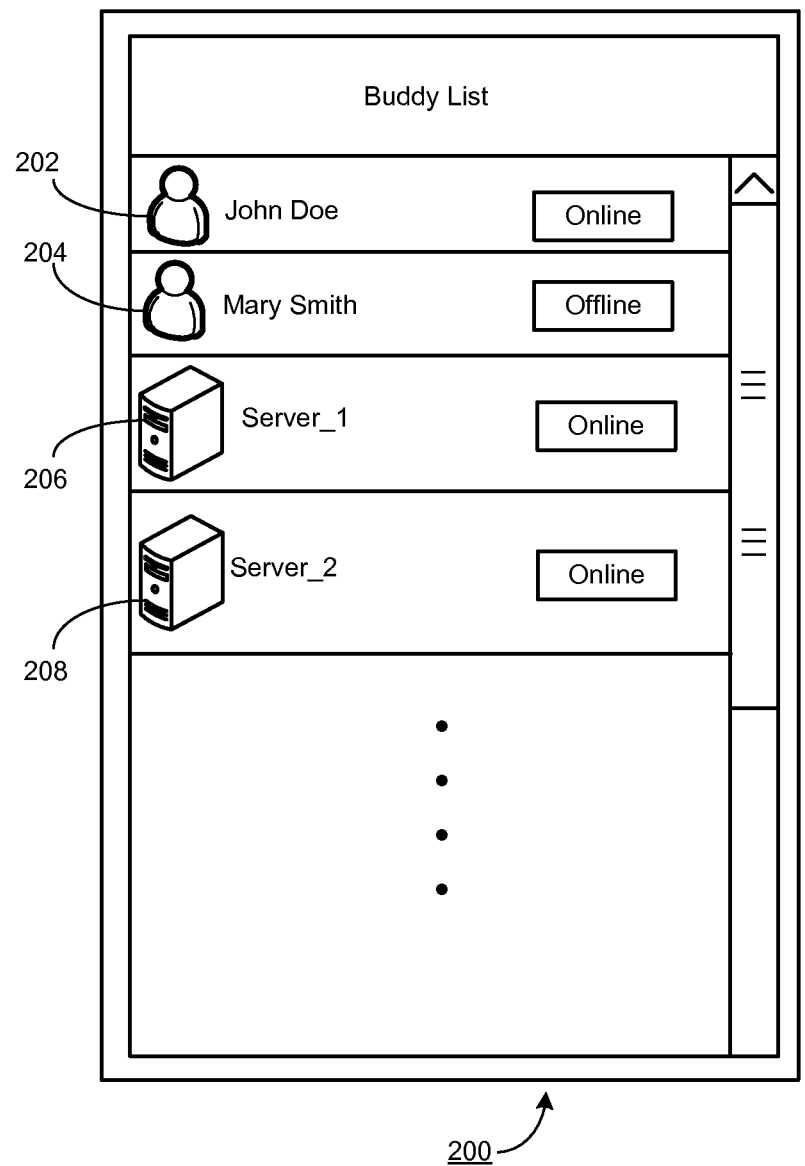
FIG. 2 presents a diagram illustrating an exemplary view of the user interface of the chat client application.

FIG. 2 presents a diagram illustrating an exemplary view of a user interface of the chat client application. In the example illustrated in FIG. 2, a user interface of a chat application 200 includes a contact list, which is a list of entities that the user of chat client application 200 is authorized to chat with. The contact list includes not only human contacts, such as contacts 202 and 204, but also contacts that are machines, such as contacts 206 and 208. Note that specific icons (usually in the form of a picture of a machine) can be used to identify a particular contact as a machine. As one can see in FIG. 2, the contact list can be presented in a similar way to a contact list in conventional instant messaging systems. In addition to displaying a list of contacts, the contact list also displays the status, such as "online" or "offline," of each contact.

Optionally, from the perspective of chat client application 200, there can be little difference between a machine and a human. Chat client application 200 treats a machine contact of a user in the same way as his human contacts. During operation, a user can initiate a conversation with any one of his contacts, either a machine or a human, by clicking on the name of the contact. For example, if user 118 wants to start a chat session with the Server_1 machine (contact 206), he can click on the corresponding icon and, in response, a conversation window will appear. User 118 can then "chat" with the Server_1 machine inside the conversation window.

In addition, user 118 can type inside the conversation window a text message, such as "show me logs." In response, machine-monitoring server 104, which monitors the performance of the Server_1 machine, can transmit the system log of Server_1 to user 118 via a chat client application running on machine-monitoring server 104. Similarly, if machine-monitoring server 104 observes an abnormality on a machine, such as a CPU spike on the Server_2 machine, machine-monitoring server 104 can initiate a chat session with user 118 via a chat client application associated with the Server_2 machine. Consequently, on user client machine 112, a conversation window appears. Within the conversation window, the Server_2 machine "chats" with the user, sending, for example, a text message that says "CPU Spike 99%." User 118 can then instruct machine-monitoring server 104 to restart the Server_2 machine by typing a reply in the conversation window, saying "restart machine."

In the event that user 118 is offline while machine-monitoring server 104 attempts to report a machine abnormality, machine-monitoring server 104 can send an "offline" message to user 118 via the corresponding chat client. The offline message can be cached at the chat server and delivered to the user once the user logs into his chat account.

Note that depending on the rules that govern the interactions between machine-monitoring server 104 and the monitored machines, various syntaxes can be used for the machine-human chatting. In one embodiment, the machine-human chatting syntax can resemble a human conversation.

In addition to allowing a human to chat with a machine, the system described herein can also facilitate group chatting that involves multiple users and machines. For example, when something happens to a machine (such as an email server) that may require attention from multiple users, instead of the machine sending separate reports to multiple users, and the users communicating among themselves using separate channels (such as emails or phone calls), a group chat that includes the machine and multiple users can ensure that everyone involved is notified of the event. In one embodiment, machine-monitoring server 104 may maintain a list of users to be notified in response to certain machine events. When such an event occurs, all users involved are notified to become group-chat participants. In the group chat, the machine can broadcast its abnormality to multiple users simultaneously, and the users can collectively solve the problem by talking among themselves and talking to the machine. In addition to text-based conversations, the chat client applications may also include web-conferencing and voice-call plug-ins, thus enabling the involved users to start a web conference or participate in a conference call.

Figure 3:
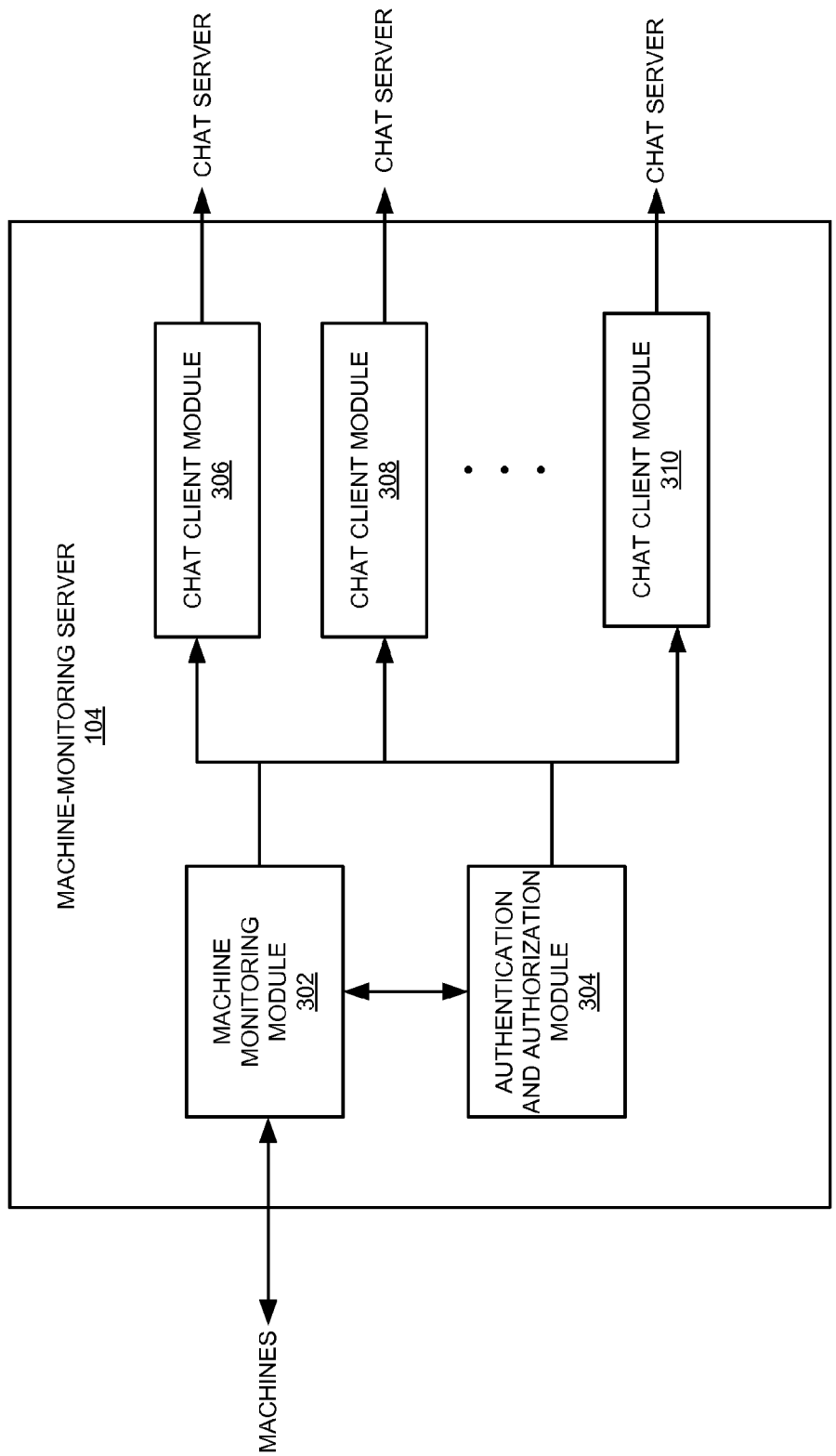
FIG. 3 presents a diagram illustrating an exemplary architecture of a machine-monitoring server.

FIG. 3 presents a diagram illustrating an exemplary architecture of a machine-monitoring server. Machine-monitoring server 104 includes a machine-monitoring module 302, an authorization module 304, and a number of chat client modules 306, 308, and 310.

Machine-monitoring module 302 monitors the performance of a number of machines and generates status logs for each individual machine. The monitored machine state information can include, but is not limited to: CPU usage, cache usage, memory usage, power usage, input/output, malicious software detection, etc. In addition, machine-monitoring module 302 can receive user commands via a chat session, and forward such commands to a monitored machine.

Authentication and authorization module 304 authenticates a user, such as a system administrator, on behalf of a particular monitored machine. When such a user is authenticated, the user is added to the machine's contact list. In addition, authentication and authorization module 304 further determines whether the user is authorized to view the machine's performance monitoring data or to send executable commands to that machine. For example, certain users may be allowed to view the system logs of a machine but are precluded from sending executable commands to that machine. In addition, depending on a user's role, certain users may be allowed to view only a subset of the performance monitoring data.

Each chat client module, such as modules 306, 308, and 310, runs a chat client application for an user machine. Each chat client module interacts with machine-monitoring module 302 in order to obtain performance monitoring information associated with a corresponding machine, and to forward an executable command to that corresponding machine. Moreover, each chat client module receives input from authorization module 304 in order to determine whether to add a particular user to its contact list, or whether to respond to a message sent by a particular user. For example, if a user is authorized to view the system logs of a machine but denied the right to send executable commands, then during a chat session with that user, machine-monitoring module 302 obtains the user's authorization information from authentication and authorization module 304, and only responds to the user commands for viewing system logs of that machine. As a result, the corresponding chat client module will respond to requests like "show me logs," but will not respond to requests like "restart machine." Note that a user authentication into a monitored machine can be different from the user's authentication into the chat service. In other words, a user may be authenticated to use the chat service by chat server 102, but may be required to be authenticated separately for each machine the user wishes to monitor or control (e.g., by providing a separate set of authentication credential that is specific to each monitored machine).

Machine-monitoring server 300 can also include other communication modules (not shown in FIG. 3) in addition to the chat client modules in order to provide additional communication channels between the machines and a user. For example, machine-monitoring server 104 may include an SMS module that sends SMS messages to a user in response to a certain event associated with a machine. Similarly, machine-monitoring server 300 may include an email module that sends emails to the user.

Figure 4A:
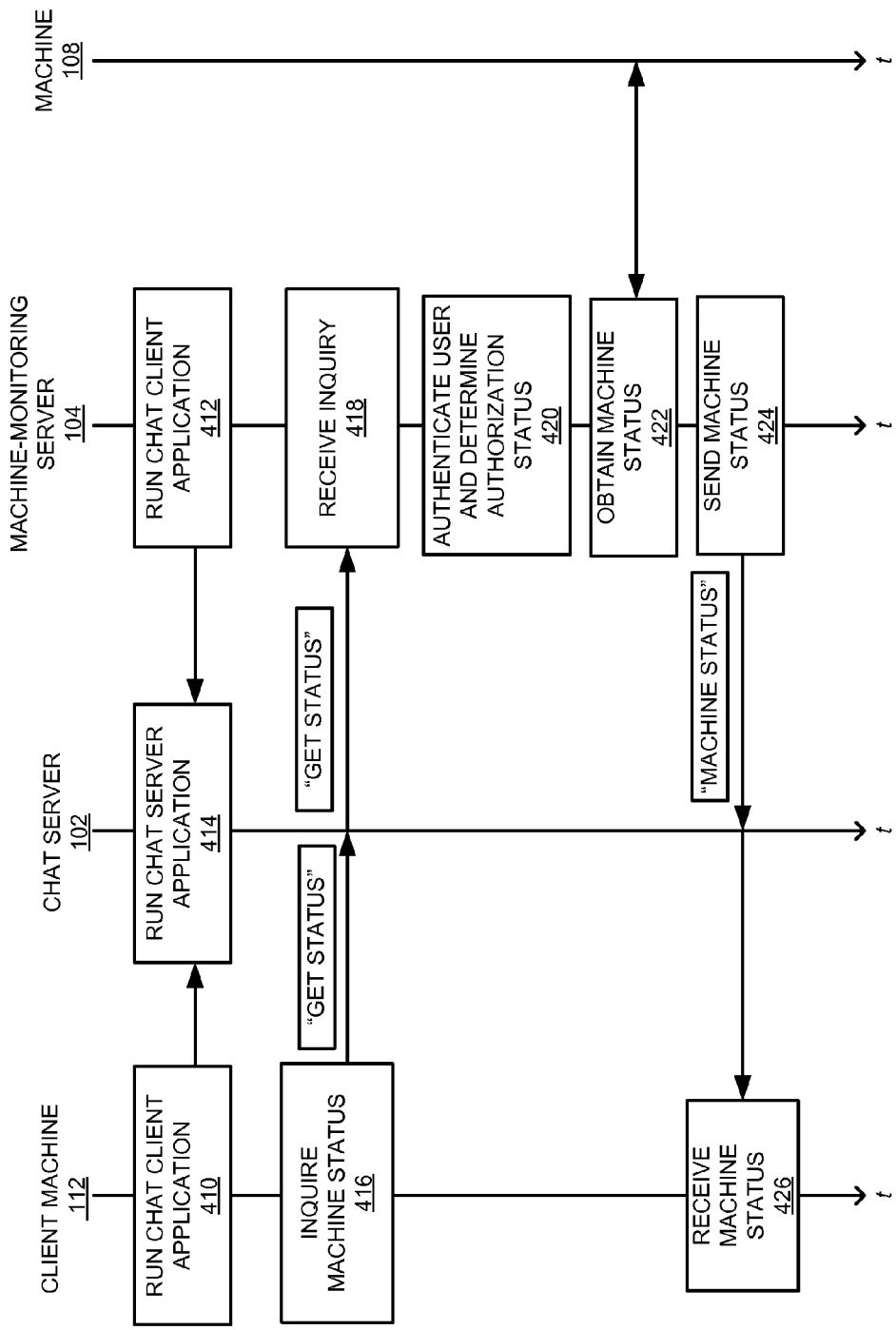
FIG. 4A presents a time-space diagram illustrating an exemplary process of a chat session between a user and a machine.

FIG. 4A presents a time-space diagram illustrating an exemplary process of a chat session between a user and a machine. During operation, user 118 runs chat client application 200 on client machine 112 (operation 410). Machine-monitoring server 104 also runs a chat client application (operation 412). Chat server 102 runs a chat server application (operation 414). Chat server 102 and client applications operate based on the AMQP standard. In one embodiment, chat server 102 and client applications facilitate instant messaging based on RabbitMQ™ messaging tools. Using the chat interface on client machine 402, user 118 inquires about the status of machine 108 by sending a "GET STATUS" message via the chat application (operation 416). Consequently, machine-monitoring server 104 receives that inquiry via its own chat interface (operation 418). The syntax used by user 118 to inquire the machine status is pre-defined by the machine-monitoring application running on machine-monitoring server 104. Other than inquiring machine status, user 118 may also send an executable command via the chat interface.

Subsequently, machine-monitoring server 104 authenticates user 118 and determines his authorization, such as whether he is authorized to receive status information associated with machine 108, what kind of information he can receive, or whether he is authorized to issue certain executable commands (operation 420). If machine-monitoring server 104 determines that user 118 is authorized to receive certain status information associated with machine 108, machine-monitoring server 104 obtains that status information (operation 422), and sends that status information to chat server 102 via the chat interface (operation 424). Note that the machine status information may be in the form of textual description, tables, charts, graphs, etc. In some embodiments, machine-monitoring server 104 obtains the machine status periodically. Client machine 112 is then able to download the machine status information via the chat interface, thus enabling user 118 to view the status of machine 108.

Figure 4B:
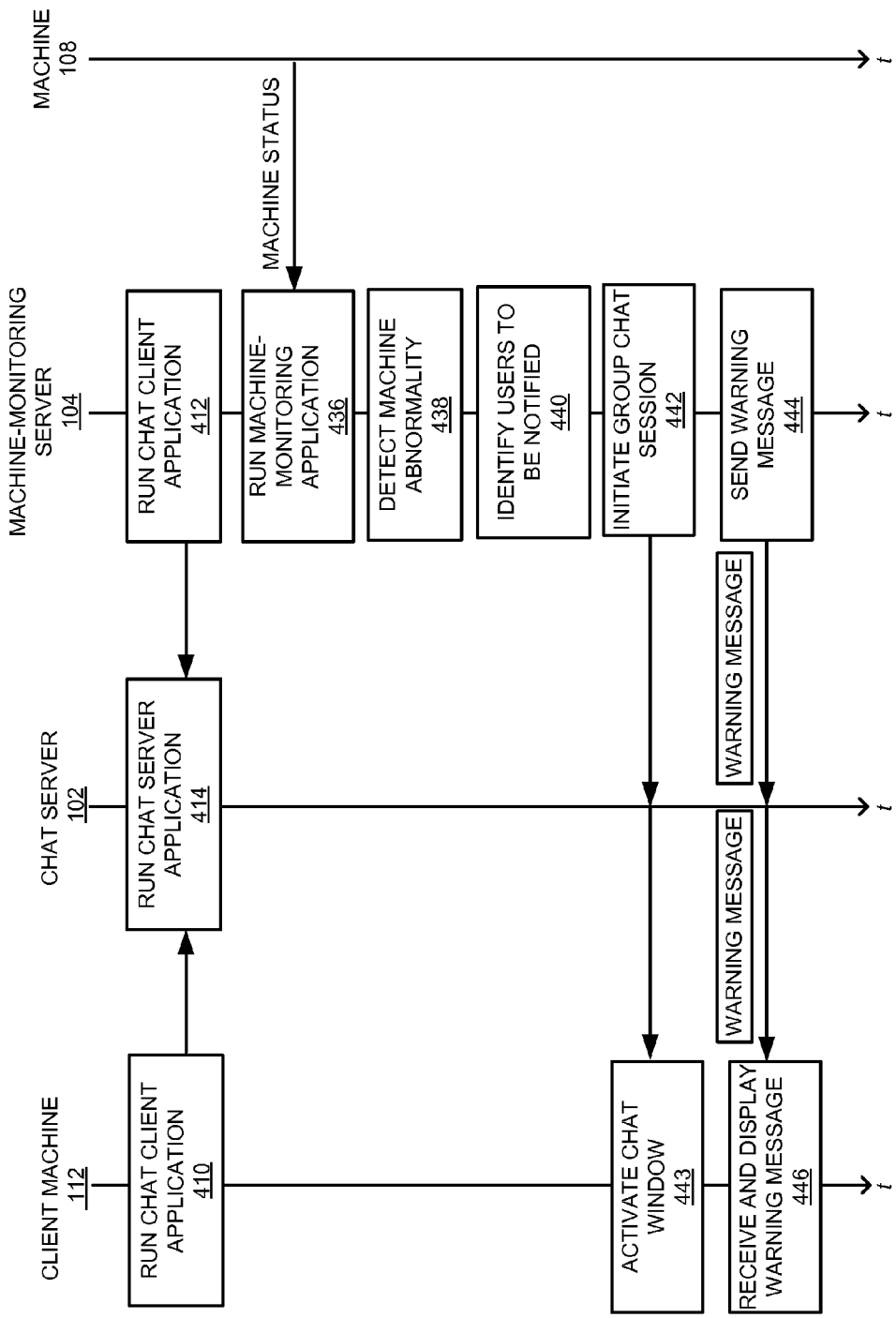
FIG. 4B presents a time-space diagram illustrating an exemplary process of a chat session between a machine and a user.

FIG. 4B presents a time-space diagram illustrating an exemplary process of a chat session between a machine and a user. During operation, user 118 runs chat client application on client machine 112 (operation 410). Machine-monitoring server 104 also runs a chat client application (operation 412). Chat server 102 runs a chat server application (operation 414). Machine-monitoring server 104 monitors the performance of machine 108 by running a machine-monitoring application (operation 436), which receives machine status information from machine 108. Subsequently, machine-monitoring server 104 detects an operation abnormality (such as CPU overload or an abnormally high temperature) associated with machine 108 (operation 438). In response to such abnormality, machine-monitoring server 104 identifies a number of users that need to be notified (operation 440). Note that in one embodiment, machine-monitoring server 104 maintains a record of groups of users associated with each machine's abnormality, so that when a particular event occurs the proper user group is notified.

Subsequently, machine-monitoring server 104 initiates a group chat session with the identified users, among which is user 118 (operation 442). In some embodiments, instead of a group chat session, machine-monitoring server 104 may initialize individual chat sessions with each user. In response, client machine 112 activates a chat window for this newly initiated chat session (operation 443). Via this new chat session, machine-monitoring server 104 then sends the system warning message to chat server 404 (operation 444). Client machine 112 then receives the machine warning message via the new chat window, thereby notifying user 118 of the machine abnormality (operation 446).

Figure 5:
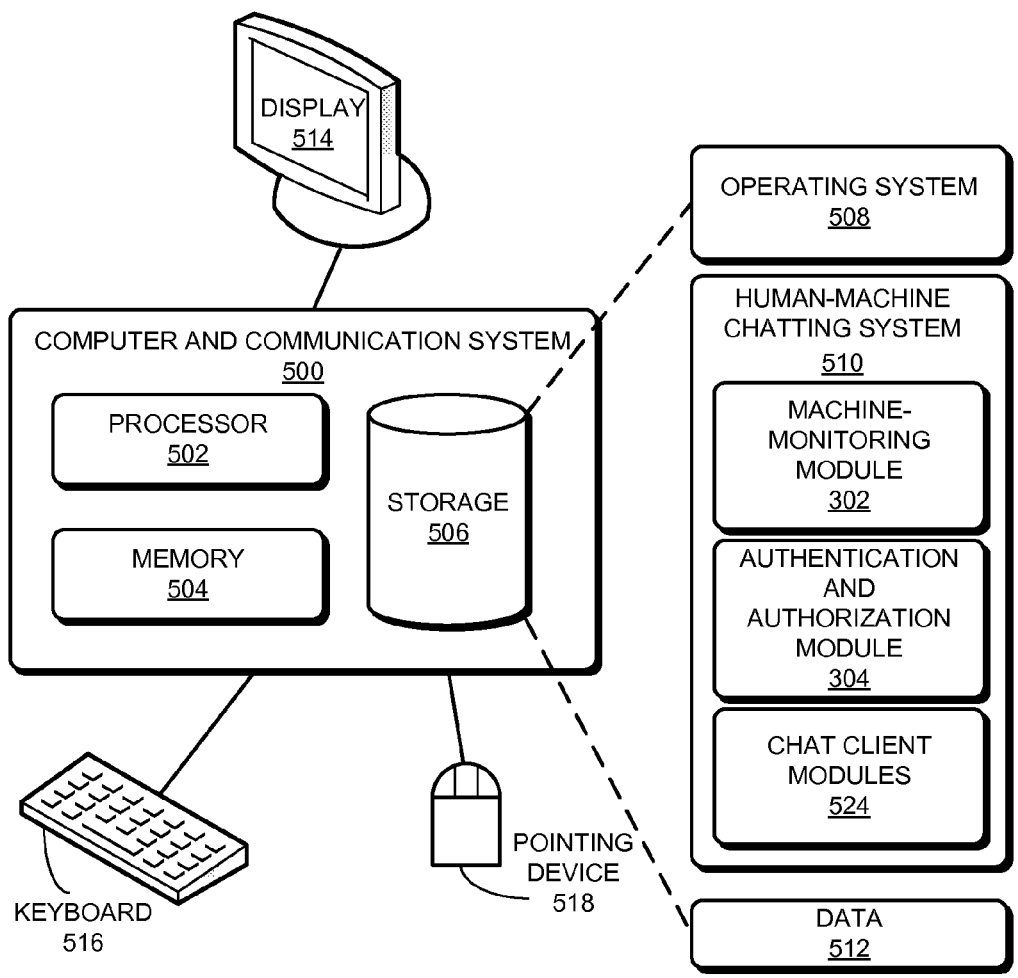
FIG. 5 illustrates an exemplary computer system for human-machine chatting.

FIG. 5 illustrates an exemplary computer system for human-machine chatting. In one embodiment, a computer and communication system 500 includes a processor 502, a memory device 504, and a persistent storage device 506. Memory 504 can include volatile memory (e.g., RAM).

Furthermore, computer system 500 can be coupled to a display device 514, a keyboard 516, and a pointing device 518. Storage device 506 can store an operating system 508, a human-machine chatting system 510, and additional data 512.

Human-machine chatting system 510 can include instructions, which when loaded into memory 504 and executed by processor 502, cause processor 502 to perform methods described above. Specifically, human-machine chatting system 510 may include instructions for monitoring performance of one or more machines (machine-monitoring module 302). Further, human-machine chatting system 510 can include instructions for authenticating and determining authorization status of a user (authentication and authorization module 304). Human-machine chatting system 510 can also include instructions for running a chat client application, which facilitates real-time two-way communications between a user and a machine (chat client modules 524).

Data 512 can include any data that is required as input or generated as output by the methods and/or processes described in this disclosure. Specifically, data 512 can store a chatting history between a user and a machine.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
   monitoring performance of a virtual machine;
   running a chat application corresponding to the monitored virtual machine;
   determining whether a user is authorized to access performance information associated with the monitored virtual machine;
   in response to the user being authorized to access the performance information, allowing the user to obtain the performance information via the chat application;
   maintaining a record of groups of users associated with each abnormality of the monitored virtual machine;
   in response to detecting an abnormality associated with the monitored virtual machine, sending a warning message, via the chat application, to a group of users associated with the abnormality and authorized to access the performance information;
   receiving an executable command from a user in the group of users via the chat application;
   determining whether the user is authorized to issue the executable command to the virtual machine; and
   in response to the user being authorized to issue the command, forwarding the command to be executed on the virtual machine.

2. The method of claim 1, wherein the chat application is based on an Advanced Message Queuing Protocol (AMQP) standard.

3. The method of claim 1, further comprising authenticating the user before determining whether the user is authorized.

4. The method of claim 3, wherein in response to the user being authorized to access the performance information, the method further comprises:
   adding the user to a contact list of the monitored virtual machine in the chat application; and
   presenting to the user a chat interface that allows the user to add the monitored virtual machine as a contact.

5. The method of claim 1, wherein sending the warning message involves initiating a group chat session that involves two or more users.

6. A non-transitory computer-readable storage medium storing instructions that when executed by a computer cause the computer to perform a method, the method comprising:
   monitoring performance of a virtual machine;
   running a chat application corresponding to the monitored virtual machine;
   determining whether a user is authorized to access performance information associated with the monitored virtual machine;
   in response to the user being authorized to access the performance information, allowing the user to obtain the performance information via the chat application;
   maintaining a record of groups of users associated with each abnormality of the monitored virtual machine;
   in response to detecting an abnormality associated with the monitored virtual machine, sending a warning message, via the chat application, to a group of users associated with the abnormality and authorized to access the performance information;
   receiving an executable command from a user in the group of users via the chat application;
   determining whether the user is authorized to issue the executable command to the virtual machine; and
   in response to the user being authorized to issue the command, forwarding the command to be executed on the virtual machine.

7. The storage medium of claim 6, wherein the chat application is based on an Advanced Message Queuing Protocol (AMQP) standard.

8. The storage medium of claim 6, wherein the method further comprises authenticating the user before determining whether the user is authorized.

9. The storage medium of claim 8, wherein in response to the user being authorized to access the performance information, the method further comprises:
   adding the user to a contact list of the monitored virtual machine in the chat application; and
   presenting to the user a chat interface that allows the human administrator to add the monitored virtual machine as a contact.

10. The storage medium of claim 6, wherein sending the warning message involves initiating a group chat session that involves two or more users.

11. A computer system, comprising:

a processor;

a memory coupled to the processor;

a monitoring module configured to monitor performance of a virtual machine and maintain a record of groups of users associated with each abnormality of the monitored virtual machine; and;

a chat module configured to run a chat application corresponding to the monitored virtual machine and further configured to send a warning message to a group of users associated with an abnormality via the chat application in response to the monitoring module detecting the abnormality associated with the virtual machine;

an authorization module configured to determine whether the user is authorized to access performance information associated with the monitored virtual machine, and wherein in response to the user being authorized to access the performance information, the chat module is configured to allow the user to obtain the performance information via the chat application; and a command execution module configured to:
receive an executable command from the user via the chat application; and
in response to the authorization module determining that the user is authorized to issue the command, forward the command to be executed on the virtual machine.

12. The computer system of claim 11, wherein the chat application is based on an Advanced Message Queuing Protocol (AMQP) standard.

13. The computer system of claim 11, wherein the authorization module is further configured to authenticate the user before determining whether the user is authorized.

14. The computer system of claim 13, wherein in response to the user being authorized to access the performance information, the chat module is further configured to:
add the user to a contact list of the monitored virtual machine in the chat application; and
present to the user a chat interface that allows the human administrator to add the monitored virtual machine as a contact.

15. The computer system of claim 11, wherein while sending the warning message, the chat module is configured to initiate a group chat session that involves two or more users.

16. The method of claim 1, wherein the abnormality associated with the virtual machine is a central processing unit (CPU) overload.

17. The method of claim 1, wherein the abnormality associated with the virtual machine is a temperature above a predetermined threshold.

18. The method of claim 1, wherein determining whether a user is authorized to access performance information associated with the monitored virtual machine further comprises determining whether the user is authorized to check a system log.

* * * * *